United States Patent Office 3,061,270
Patented Oct. 30, 1962

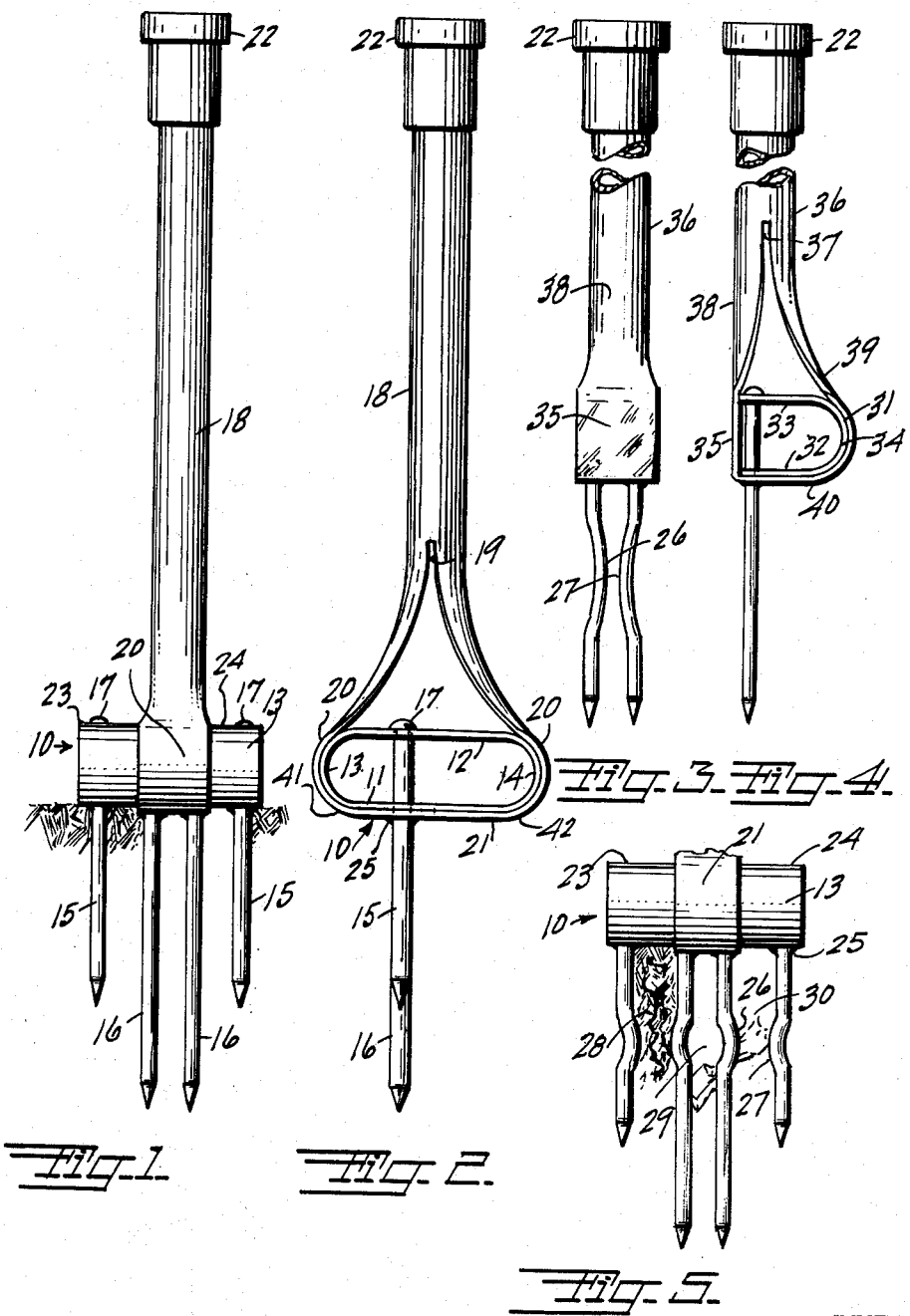

3,061,270
LAWN AND GARDEN TOOL
Sahn K. Lowe, 3956 Koko Drive, Honolulu 16, Hawaii
Filed Aug. 31, 1959, Ser. No. 837,184
5 Claims. (Cl. 254—132)

This invention relates to improvements in lawn and garden tools with special relation to hand weeding, differentiating from conventional weeders in its capacity for loosening the soil to permit the removal of the weed with its roots, instead of cutting the roots off and leaving the deeper portions to re-sprout.

The conventional weeder, having a V-shaped cutting and penetrating element, will damage any surrounding desirable plants or grass and almost certainly cut the roots of the weed, while with my invention, the soil is merely loosened so that the weed alone is removable, the invention benig devoid of any cutting edges.

My tool also serves as an excellent hand cultivating tool for flower gardens, as a rake for segregating stones or other undesirable articles from the soil, and serves perfectly in the removal of weeds and grass from gravel walks and driveways, and even from the cracks in concrete walks or driveways. It cannot be excelled for removing patches of spreading, shallow-rooted weeds in lawns.

This invention can be provided with two or more tines, any tines in excess of two being made shorter so as to provide sequential penetration, with the center tines having penetrated the hard top crust before the side tines start penetration, thus reducing the effort necessary for driving the tool. This feature also provides for easier application of rotative operation of the tool when mixing fertilizer, sand, or other material in loose soil.

This tool can be provided with either, a rear fulcrum only for better observation of the point of application of the tines, or with both, front and rear fulcrums for working of the soil in opposite directions, while simultaneously providing a ledge on each side for foot operation or depression into the soil. It can also be made with straight or intermediately bowed tines, as will further on be explained.

The objects and advantages of the invention are as follows:

First, to provide a garden implement which is specially adapted for weeding without recourse to cutting edges of any type.

Second, to provide a garden implement as outlined which is particularly effective in loosening the soil during penetration so that weeds may be removed with all roots.

Third, to provide a tool as outlined in which tines in excess of two are made only slightly over half the length of the said two tines, for sequential penetration of hard top soil for easier operation of the tool.

Fourth, to provide a garden implement as outlined with tines which are oppositely curvilinearly formed intermediate their lengths for opposed bearing to break up the soil.

Fifth, to provide an implement as outlined with both, front and rear fulcrums for reverse operation for effectively breaking up the soil following full penetration of the tines.

Sixth, to provide an implement as outlined with a base having spaced top and bottom walls, and with the tines passing through the bottom wall and being fixed to the top wall, for extreme rigidity and strength.

Seventh, to provide an implement as outlined which is of the simplest possible construction and minimum weight in conformity with the strength and rigidity desired.

In describing the invention reference will be had to the accompanying drawings, in which:

FIG. 1 is a front elevation of the invention in a form best adapted for relatively loose and soft soil.

FIG. 2 is a side elevation of FIG. 1.

FIG. 3 is a front elevation of a modification provided for relatively small-rooted weeds, for harder soil, the curved tines causing disruption of the soil as the tines are forced downwardly into the ground. It is also the most desirable type for removal of weeds and grass from cracks in concrete.

FIG. 4 is a side elevation of FIG. 3.

FIG. 5 is a front elevation of a four-prong tool with curved tines for effective breaking of the soil, and convenient removal of frictionally held pebbles or rocks.

As illustrated in FIGS. 1, 2 and 5, the base 10 is substantially elliptical in form and having a bottom wall 11, top wall 12, and end walls 13 and 14, the top and bottom walls being preferably parallel and well spaced, on the order of one to one-and-one half inches to provide a suitable fulcrum for maximum strength and rigidity for the tines 15 and 16, which pass through the bottom wall 11 and are fixed in or to the top wall 12 by any suitable means such as welding or riveting indicated at 17.

This base may be formed of a strip of metal, or a short section of cylindrical tubing may be flattened to the shape shown.

The handle 18 is formed of a section of cylindrical or elliptically formed tubing, one end of the tube being diametrically split as indicated at 19, the split ends flared out and flattened as indicated at 20 and thence formed about the base, centrally thereof as indicated at 21 and being preferably spot welded to the base to provide a strong and rigid construction, and the top of the handle is provided with a cushion cap 22 for applying pressure by the hand, while the projecting side portions 23 and 24 of the base permit foot pressure to be applied.

It will be noted that the side or additional tines 15 are made shorter than the central tines 16, for the purposes previously described, and are substantially three-fifths the length. As indicated, the tines can also be fixed in the bottom wall as by welding indicated at 25.

The type so far described is suitable for relatively loose or soft ground which breaks up easily, but for relatively hard soil the type illustrated in FIG. 5 is most effective, as also for soil containing pebbles or small rocks. These tines are oppositely curved intermediate their heights as indicated at 26 and 27 causing the soil to be crushed or disintegrated as indicated at 28 while also providing for easier removal of pebbles or rocks, the pebbles or rocks wedging either in the straight portions for forcing into the expanded portion at 29 or into the straight portions 30 above the contracted portion.

The modification illustrated in FIGS. 3 and 4 is particularly adapted to close work, or operation on cracks in concrete walks or driveways, and for small weeds, and may be made with straight or convergent tines as shown. With this type, only one half of the elliptical form is used for the base as indicated at 31, also having a bottom wall 32, top wall 33 and a rear wall 34, the front wall being formed by the straightened or flattened portion 35 of the handle 36, which is similarly split as indicated at 37, but with the front wall 35 forming a continuation of the front wall 38 of the handle, the back wall of the handle being curved backwardly as indicated at 39 and continuing about and under the base as indicated at 40 and being fixed thereto as by welding. The tines are fixed in the top and bottom walls in the same manner except close to the front, providing only a rear fulcrum, while those illustrated in FIGS. 1, 2 and 5 have both, front and rear fulcrums as indicated at 41 and 42. In view of the frontal location of the tines in FIGS. 3 and 4, the point of application of the tines is more readily observed.

I claim:

1. In a weeding fork having tines, mounting means for said tines comprising an oval tubular base having top, bottom, and semicircular end walls, with the tines mounted centrally between said end walls, and a tubular handle having its lower end diametrically split upwardly with the respective half members formed by the split flattened and flared outwardly from each other and thence about the end walls and bottom wall to provide a rigid base and handle combination, with the semicircular end walls providing fulcrums for reverse operations of the tool.

2. A garden tool comprising a top wall and a bottom wall vertically spaced and having front and rear ends with arcuate connections therebetween to form a substantially oval base,
   a plurality of tines passing through said bottom wall in transverse alignment centrally between said ends, and anchored in said top wall to provide rigidity, and
   a tubular handle diametrically split upwardly from its lower end, with the split portions oppositely flared and flattened and formed about said ends and fixed thereto,
   with the handle projecting upwardly from said base and terminating at the top in a handhold,
   said ends and arcuate connections providing front and rear fulcrums for leverage in respective directions for loosening soil.

3. A structure as defined in claim 2, said tines including a pair of spaced central tines and spacedly related side tines with the side tines having a length not to exceed sixty percent of the length of the central tines measured from the bottom wall, said tines being arcuately formed in opposition in registrable relation to each other and substantially centrally of the lengths of the side tines for disintegration of soil therebetween, and for breaking the top soil to decrease the load on the central tines when turning up the deeper soil for uprooting weeds and the like.

4. In a garden tool having tines, mounting means for the tines comprising
   an elongated base substantially oval in cross-section and having front and rear ends providing fulcrums,
   with said tines transversely spaced and fixed centrally between said ends, and
   a tubular handle diametrically split upwardly from its lower end,
   with the split portions divergently formed and flattened,
   with the flattened portions formed about the ends and underside of said base and fixed thereto
   to provide increased strength and rigidity for the base and handle and to reinforce the fulcrums.

5. A garden tool comprising an elongated base, a plurality of spaced tines anchored in said base in transverse alignment centrally of the length and projecting downwardly therefrom,
   a tubular handle having its lower end diametrically split upwardly, with the respective half portions flattened and
   encompassing and fixed about said base, with
   the handle projecting upwardly centrally of the base and terminating at the top in an enlarged handhold for hand operation of said tool.

References Cited in the file of this patent

UNITED STATES PATENTS

| 26,354 | Herald | Dec. 6, 1859 |
| 96,794 | George | Nov. 16, 1869 |
| 700,685 | Havill | May 20, 1902 |
| 820,292 | Dunbar | May 8, 1906 |
| 1,536,620 | Newell | May 5, 1925 |
| 1,857,500 | Davison | May 10, 1932 |

FOREIGN PATENTS

| 4,906 | Great Britain | Feb. 28, 1907 |